(12) United States Patent
Fiello et al.

(10) Patent No.: US 7,452,395 B2
(45) Date of Patent: Nov. 18, 2008

(54) AIR FILTER FOR A SCOOP

(75) Inventors: Jonathan Richard Fiello, Yucaipa, CA (US); David James Miles, Sun City, CA (US); Steve Williams, Loma Linda, CA (US)

(73) Assignee: K&N Engineering, Inc., Riverside, CA (US)

( * ) Notice: Subject to any disclaimer, the term of this patent is extended or adjusted under 35 U.S.C. 154(b) by 18 days.

(21) Appl. No.: 10/956,183

(22) Filed: Sep. 30, 2004

(65) Prior Publication Data

US 2006/0086073 A1    Apr. 27, 2006

(51) Int. Cl.
*B01D 50/00* (2006.01)

(52) U.S. Cl. .......................... 55/385.3; 55/414; 55/482; 55/510; 55/521; 55/498; 55/529; 55/517; 55/519; 55/320; 55/322; 123/198 E; 123/593

(58) Field of Classification Search ................ 55/385.3, 55/414, 482, 510, 521, 498, 529, 517, 519, 55/320, 322; 123/198 E, 593
See application file for complete search history.

(56) References Cited

U.S. PATENT DOCUMENTS

| | | | | |
|---|---|---|---|---|
| 3,870,495 A | * | 3/1975 | Dixson et al. ................. | 55/489 |
| 5,147,430 A | * | 9/1992 | Kidd .......................... | 55/385.3 |
| 5,958,096 A | * | 9/1999 | Yee et al. ..................... | 55/385.3 |
| 6,059,851 A | * | 5/2000 | DePietro et al. ............. | 55/385.3 |
| 6,258,144 B1 | * | 7/2001 | Huang ......................... | 55/385.3 |
| 6,319,298 B1 | * | 11/2001 | Ng-Gee-Quan .............. | 55/331 |
| 6,638,330 B1 | * | 10/2003 | Bergami ..................... | 55/315.1 |
| 6,955,699 B2 | * | 10/2005 | Bergami ..................... | 55/385.3 |
| 7,179,315 B2 | * | 2/2007 | Huang ......................... | 55/337 |
| 2005/0076621 A1 | * | 4/2005 | Chang ......................... | 55/320 |

* cited by examiner

*Primary Examiner*—Duane Smith
*Assistant Examiner*—Minh-Chau T. Pham
(74) *Attorney, Agent, or Firm*—Rutan & Tucker, LLP

(57) ABSTRACT

An air filter has an inner filtering body within an outer filtering body. The air filter is configured to fit inside a scoop and adjacent to the inlet opening of the scoop. By placing the air filter adjacent to the inlet opening of the scoop, the size of the air filter may be increased as compared to a traditional air filter which fits within the neck area of the scoop. As such, the surface area of the air filter may be increased to provide more air to an air intake system such as a carburetor, fuel injectors, throttle body, or the like, as compared the traditional air filter. The inner filtering body may be recessed inside or protrude from the outer filtering body. The inner filtering body may be coupled to the outer filtering body along the base of the air filter. The inner filtering body increases the surface area of the air filter so that more air may be provided to the air intake system of a vehicle.

15 Claims, 4 Drawing Sheets

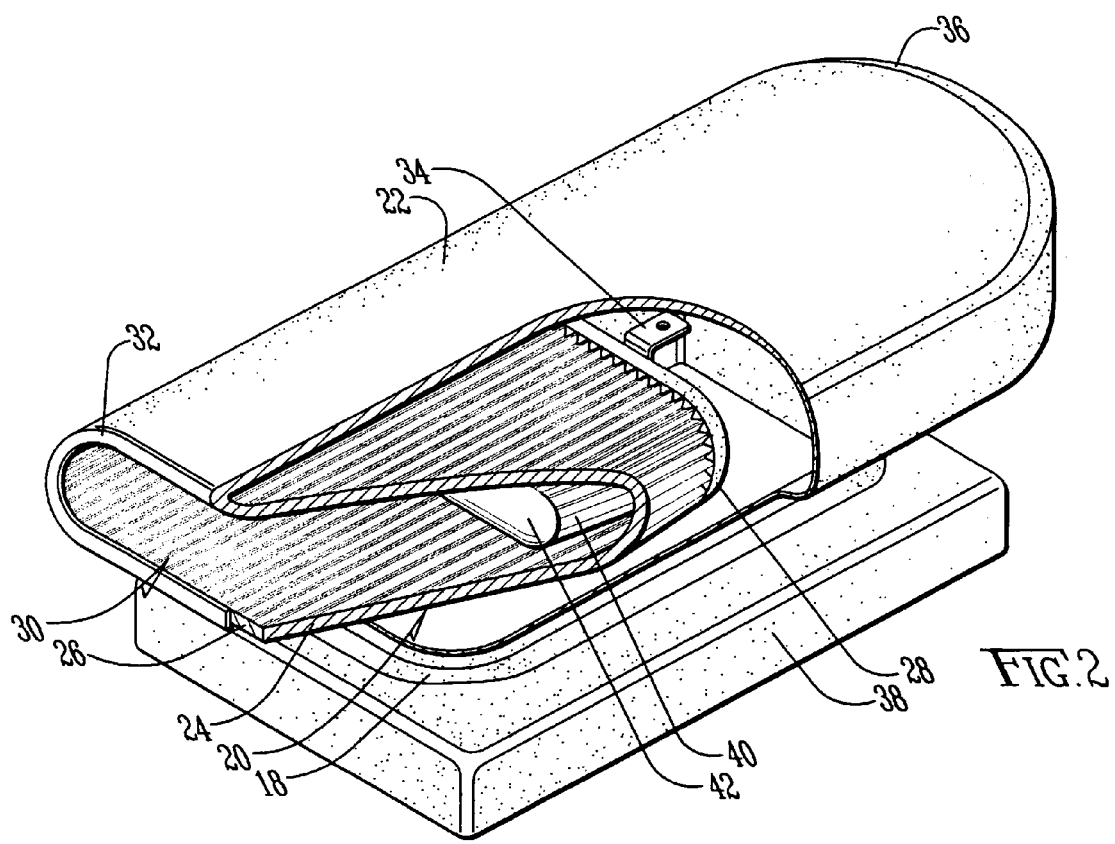

AIR FILTER FOR A SCOOP

BACKGROUND OF THE INVENTION

1. Field of the Invention

This invention is directed to an air filter adapted to filter air passing through a scoop which is mounted over an air intake system such as a carburetor, fuel injector or throttle body of a vehicle.

2. General Background and State of the Art

FIG. 1 is a cross-sectional view of a scoop 10 designed to direct air to a traditional air filter 14 mounted over an air intake system of an engine such as a carburetor, fuel injector, throttle body or the like. Air enters through a front opening 12 of the scoop 10 which is filtered by the traditional air filter 14 before the filtered air is provided to the air intake system. The air filter 14 is mounted over the air intake system such that the air filter 14 fits within the neck area 18 of the scoop 10. The design of this scoop 10 is such that the size of the air filter 14 is limited by the space available near the neck area 18 of the scoop 10. In some applications, no filter is used so that unfiltered air is directly provided to the air intake system.

The scoop 10 is generally used in high performance vehicles such as race cars. The scoop 10 is generally designed to direct as much air as possible to the filter 14 to enhance the performance of the race car. In some instances, race cars can reach the speed of 160 miles per hour or more in a few seconds. At such high speeds, there may not be enough surface area in the traditional filter 14 to intake the air flowing through the front opening 12. In addition, the flow rate of the air through the front opening 12 of the scoop 10 may be so high that the air flow path inside the scoop 10 from the front opening 12 to the filter 14 may become turbulent such that air may not efficiently flow from the front opening 12 to the filter 14. The air turbulence within the scoop 10 can dampen the amount of air provided to the filter 14. The air turbulence within the scoop 10 can also cause the air in front of the front opening 12 to stall such that the area around the front opening 12 acts as a boundary layer or wall. This increases the drag on the car, in particular at high speeds. As such, there is a need to increase the flow rate of air through the scoop 10 and to the air intake system while minimizing the drag on the vehicle.

SUMMARY OF THE INVENTION

This invention is directed to providing an air filter adapted to fit inside a scoop and adjacent to the inlet opening of the scoop. The air filter has an outer filtering body between a lip and a base. The air filter has a mouth defined by the lip to receive air so that the outer filtering body can filter the air passing through the mouth of the air filter. The configuration of the lip may be substantially similar to the front opening of the scoop. The air filter may be mounted within the scoop with the lip of the air filter placed adjacent to the inlet opening of the scoop. The base of the air filter may be adapted to couple the air filter to the scoop.

By placing the air filter within the scoop and adjacent to the inlet opening of the scoop, the size of the air filter may be increased as compared to a traditional air filter which fits within the neck area of the scoop. As such, the surface area of the air filter may be increased to provide more air to the air intake system as compared to the traditional air filter. In addition, with the air filter mounted adjacent to the inlet opening of the scoop, the air filter may reduce the air velocity through the inlet opening of the scoop. By reducing the air velocity through the inlet opening of the scoop, the air filter minimizes the occurrence of air turbulence forming within the scoop, thereby increasing restrictions.

The air filter may also have an inner filtering body within the outer filtering body. The inner filtering body may be coupled to the outer filtering body along the base of the air filter. The inner filtering body may have a tip extending from the base of the air filter. The tip of the inner filtering body may be within the mouth of the outer filtering body to provide additional surface area to filter the air entering the mouth of the outer filtering body. The inner filtering body may also act as a boundary surface to guide the air flowing into the mouth towards the outer filtering body. The tip of the inner filtering body may also protrude from the mouth of the outer filtering body to increase the surface area of the inner filtering body and to allow the air in front of the inlet opening of the scoop to be drawn into the scoop. The tip protruding from the inlet opening of the scoop also improves the aerodynamics of the scoop because the protruding tip rounds off the inlet opening of the scoop.

Other systems, methods, features and advantages of the invention will be or will become apparent to one with skill in the art upon examination of the following figures and detailed description. It is intended that all such additional systems, methods, features and advantages be included within the description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 2 is a perspective cutout view of an air filter in accordance with this invention mounted within a scoop.

DETAILED DESCRIPTION OF THE INVENTION

Figure 1:
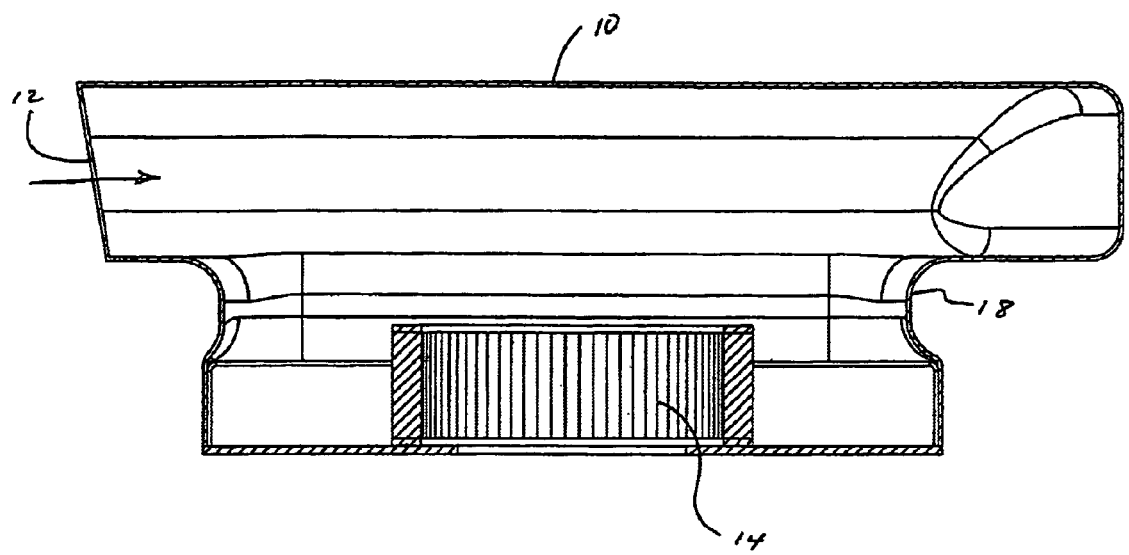
FIG. 1 is a cross-sectional view of a scoop design to direct air to a traditional air filter mounted over an air intake system of a vehicle.

FIG. 2 is a perspective cutout view of an air filter 20 within a scoop 22 which is adapted to mount over an air intake system such as a carburetor, fuel injectors, throttle body, or the like of a vehicle. The air filter 20 has an outer filtering body 24 between a lip 26 and a base 28. The air filter 20 also has a mouth 30, defined by the lip 24, adapted to receive air therethrough to allow the outer filtering body 22 to filter the air and pass the filtered air to the air intake system located underneath the scoop 22. The scoop 22 has an inlet opening 32 to receive air substantially along a horizontal plane. The scoop 22 has a back end 36 that turns the flow of air about 90 degrees towards the air intake system located near the base 38 of the scoop 22. The lip 26 of the air filter 20 may be adapted to substantially conform with the circumference configuration of the inlet opening 32 of the scoop 22 so that a substantial portion of the air passing through the inlet opening 32 of the scoop 22 passes through the mouth 30 of the air filter 20. The base 28 of the air filter 20 may have brackets 34 adapted to couple the air filter 20 to the surface area of the scoop 22.

The air filter 20 may have an inner filtering body 40 within the outer filtering body 24. The inner filtering body 40 may be coupled to the outer filtering body 24 along the base 28 of the air filter 20. The inner filtering body 40 provides additional surface area to filter the air through the air filter 20. The inner filtering body 40 may have a tip 42 which extends from the base 28 of the air filter 20. The tip 42 of the inner filter 40 may be recessed within the mouth of the outer filtering body as illustrated in FIG. 2 or protrude from the lip 26 of the outer filtering body 24, as discussed in more detail below.

Figure 3:
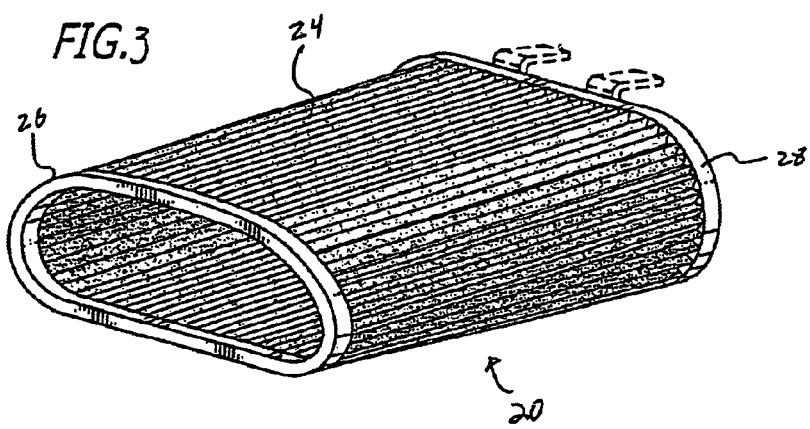
FIG. 3 is a perspective view of the air filter shown in FIG. 2 removed from the scoop.

As illustrated in FIG. 2, the scoop 22 has more internal space near the inlet opening 32 than at the neck area 18 of the scoop. As such, by placing the air filter 20 within the scoop 22 and adjacent to the inlet opening 32 of the scoop 22, the size of the outer filtering body 24 of the air filter 20 may be increased as compared to a traditional air filter which fits within the neck area of the scoop. Incorporating the inner filtering body 40 into the outer filtering body further increases the surface area of the air filter 20 to allow more air to pass through to the air filter 20 as compared to the traditional air filter. In addition, with the air filter 20 mounted adjacent to the inlet opening 32 of the scoop 22, the air filter 20 may slow down the air passing through the inlet opening 32 of the scoop 22. In other words, as air passes through the air filter 20, the air velocity slows down, which minimizes the occurrence of air turbulence forming near the back end 36 of the scoop 22. The air turbulence within the scoop 22 can interfere or restrict the flow of air to the air intake system. As such, by minimizing the occurrence of turbulence forming with the scoop, the air filter 20 improves the performance of the vehicle, in particular, at high speeds where the turbulence is more likely to occur within the scoop. FIG. 3 shows the outer filtering body 24 between the lip 26 and the base 28. The filtering body 24 may be formed so that the lip 26 and the base 28 may be integrated into the outer filtering body 24.

Figure 4:
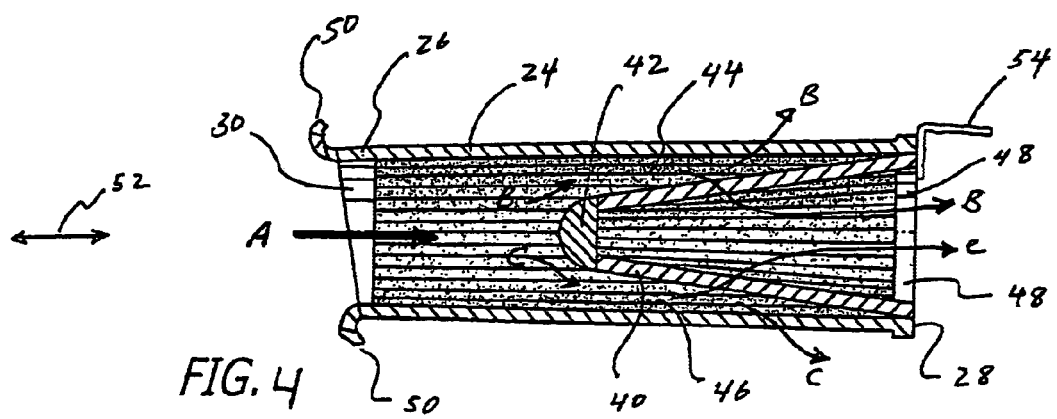
FIG. 4 is a cross-sectional view of the air filter of FIG. 2 illustrating the inner filtering body within the outer filtering body.
Figure 5:
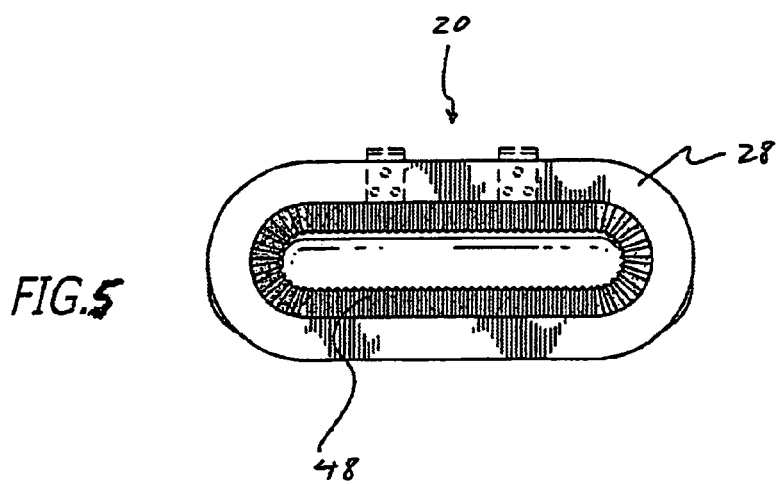
FIG. 5 is shows the back end of the air filter shown in FIG. 2.

FIG. 4 is a cross-sectional view of the air filter 20 illustrating the inner filtering body 40 within the outer filtering body 20. The inner filtering body 40 may taper towards the tip 42 from the base 28 of the air filter 20. As air, denoted by letter "A" in FIG. 4, enters through the mouth 30 of the outer filtering body 24, the tip 42 of the inner filtering body 40 may separate the air into two portions: an upper portion "B" through the gap 44, and a lower portion "C" through the gap 46. The upper portion B and the lower portion C of the air A pass through the inner and outer filtering bodies 40 and 24, as indicated by the direction arrows B and C, respectively. In particular, the air passing through the inner filtering body 40 of the air filter 20 exit through an outlet opening 48 formed on the base 28 of the air filter 20. FIG. 5 shows the back end of the air filter 20 with the exit opening 48 formed within the base 28.

With the inner filtering body 40, additional surface area is provided within the air filter 20 to filter and pass as much air as possible to the air intake system of the vehicle. In addition, at high speeds, separating the air flow A into two portions B and C may minimize the air flow A from becoming turbulent within the mouth 30 of the outer filtering body 24. As such, the air filter 20 mounted within the scoop 22 provides more air to the air intake system while minimizing the occurrence of air flow becoming turbulent. With the air filter 20 more efficiently passing filtered air to the air intake system, there is less chance that the air in front of the inlet opening 32 will stall which minimizes the drag on the car. The air filter material for the inner and outer filtering bodies may be made of a variety of materials such as a 2-ply cotton with wire mesh.

The inner filtering body 40 and the outer filtering body 24 may be positioned along the same longitudinal axis 52. The tip 42 of the inner filtering body 40 may be recessed within the mouth 30 of the outer filtering body 24 so that the tip 42 does not reduce the opening area of the mouth 30 along the lip 26. The length of the inner filtering body 40 along the longitudinal axis 52 may be about ⅔ of the length of the outer filtering body 24. The length of the outer filtering body may be as long as possible and be able to fit inside the scoop. With the scoop 22 tapering towards the inlet opening 32 from the back end 36 of the scoop, the base 28 may have a larger circumference than the lip 26 of the air filter 20 to increase the surface area of the outer filtering body 24. Referring back to FIG. 2, the air filter 20 may be placed inside the scoop 22 by inserting the air filter 20 through the opening formed along the base 38 of the scoop 22. Alternatively, the lip 26 and the base 28 may be made of flexible material so that the air filter 20 may be deformed and inserted through the inlet opening 32 of the scoop 22.

FIG. 4 also shows that the lip 26 may have a flange 50 adapted to wrap around the inlet opening 32 of the scoop 22. The flange 50 provides a smooth transition for air to pass through the inlet opening 32 and the lip 26. The flange 50 may be formed from a flexible material such as rubber to hold the lip 26 of the air filter 20 in place relative to the inlet opening 32 of the scoop 22. The base 28 of the air filter 20 may have brackets 54 adapted to mount the base 28 of the air filter 20 to the surface of the scoop 22.

Figure 6:
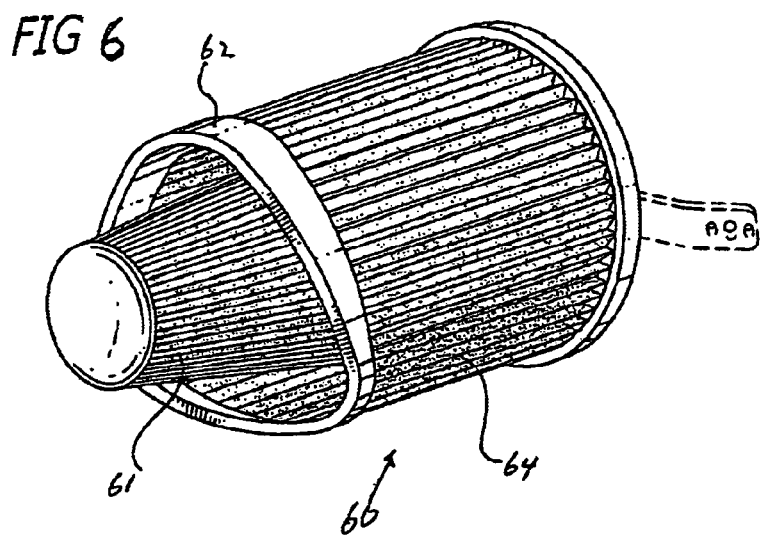
FIG. 6 is a perspective view of another air filter having an inlet filtering body protruding from the lip of the outer filtering body.
Figure 7:
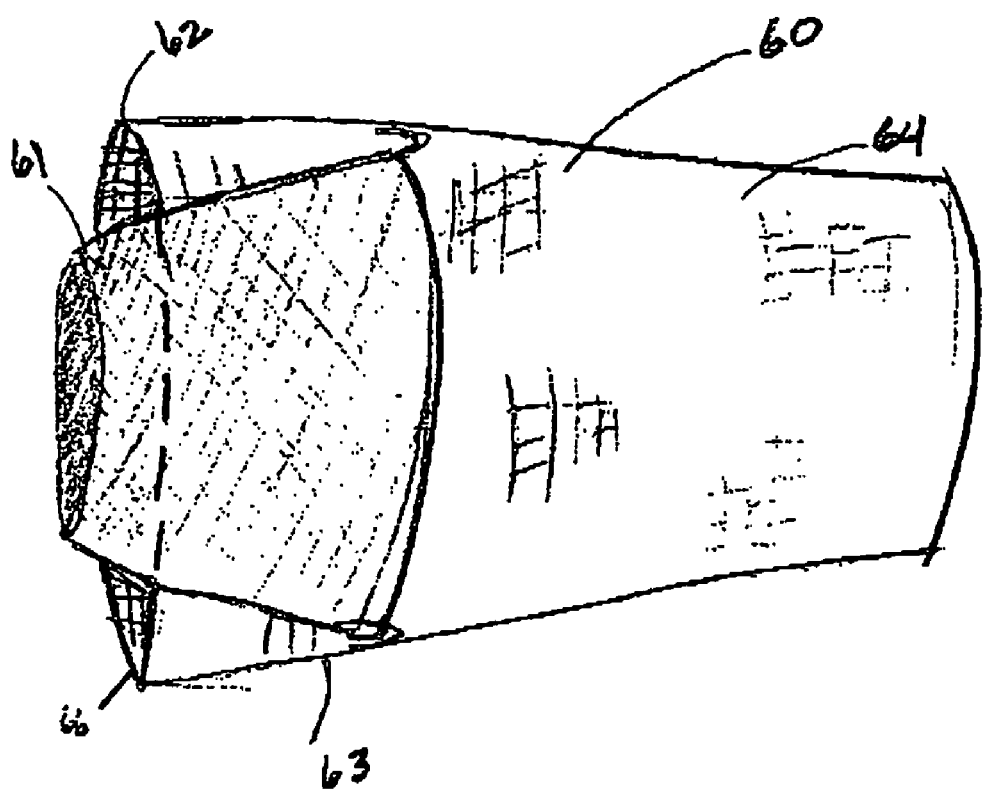
FIG. 7 is a cross-sectional view of the air filter of FIG. 4 showing the inner filtering body extending out of the lip of the outer filtering body.

FIG. 6 is a perspective view of an air filter 60 having an inner filtering body 61 protruding from the lip 62 of the outer filtering body 64. The lip 62 of the air filter 60 may have a rounded triangular shape adapted to fit inside a different scoop having an inlet opening that is similar to the lip 62 of the air filter 60. FIG. 7 is a cross-sectional view of the air filter 60 showing the inner filtering body 61 extending out of the lip 62 of the outer filtering body 63. The lip 62 of the air filter 60 may be adapted to conform to the inlet opening of the scoop. The inner filtering body 61 may have a tip 66 protruding from the lip 62 of the outer filtering body 64 and the inlet opening of the scoop. The portion of the inner filtering body extending from the lip 62 of the outer filtering body 64 may intake air in front of the lip 62 and pass the filtered air to the air intake system. In addition, the tip 66 may have a rounded shape to minimize the drag on the scoop. Accordingly, extending the inner filtering body from the lip 62 of the outer filtering body 64 may provide additional air flow to the air intake system, and minimize the drag on the car.

The air filter described above in accordance with this invention may be used in a variety of applications. For instance, even in prior applications where no filter was used with the scoop, the air filter in accordance with this invention may be provided adjacent to the inlet opening of the scoop to minimize the drag on the vehicle and to provide filtered air to the air intake system. In addition, the air filter may be used in a variety of vehicles such as race cars, boats, trucks, motorcycles, airplanes, and other high performance vehicles. The air filter in accordance with this invention may be adapted to fit inside a variety of scoops by configuring the lip of the air filter to match the configuration of the inlet opening of the scoop. As such, while various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system for providing air to an air intake system of a vehicle, the system comprising:
   a scoop having a chamber, the chamber adapted to substantially enclose the air intake system of a vehicle, the scoop having an inlet opening to only receive air through the inlet opening and pass the air through the chamber and to the air intake system of the vehicle;
   an air filter adapted to mount within the chamber of the scoop, the air filter having a flange configured to wrap around the inlet opening of the scoop, the flange defining a mouth adapted to receive air passing through the inlet opening of the scoop, the air filter having an outer filtering body to filter the air received through the mouth; and
   said air filter having a inner filtering body to filter air received through the mouth.

2. The system according to claim 1, where the air filter has a base and an inner filtering body within the outer filtering body, the inner and outer filtering bodies coupled together along the base of the air filter.

3. The air filter according to claim 2, where the inner filtering body is recessed within the mouth of the air filter.

4. The air filter according to claim 2, where the inner filtering body is recessed about ⅓ from the lip of the air filter.

5. The air filter according to claim 2, where the inner filtering body protrudes from the mouth of the air filter.

6. The air filter according to claim 1, where the base of the air filter is adapted to couple to the scoop.

7. The air filter according to claim 2, where the inner filtering body has a tip adapted to separate the air entering through the mouth of the outer filtering body to two portions: an upper portion and a lower portion.

8. An air filter adapted to filter air passing through an inlet opening of a scoop, the scoop mounted over an air intake system of a vehicle, the air filter comprising:
   a lip adapted to substantially conform with the inlet opening of the scoop, the lip defining a mouth of the air filter;
   a base;
   an outer filtering body between the lip and the base, the outer filtering body adapted to fit within the scoop mounted over an air intake system whereby the outer filtering body is adapted to substantially filter air received through the mouth of the air filter; and
   an inner filtering body within the outer filtering body, where the outer and inner filtering bodies are coupled together along the base of the air filter and the inner filtering body is substantially recessed within the mouth of the air filter.

9. The air filter according to claim 8, where the inner filtering body is recessed about ⅓ from the lip of the air filter.

10. The air filter according to claim 8, where the base of the air filter is adapted to couple to the scoop.

11. The air filter according to claim 8, where the lip has a flange adapted to wrap around the inlet opening of the scoop.

12. An air filter comprising:
   an outer filtering body having a mouth and a base, the outer filtering body adapted to filter air passing through the mouth; and
   an inner filtering body within the outer filtering body, the inner filtering body coupled to the base of the outer filtering body and adapted to filter the air passing through the mouth of the outer filtering body, the inner filtering body having a tip, whereby the tip is configured to separate the incoming air into two portions.

13. The air filter of claim 12, where the inner filtering body and the outer filtering body are along a longitudinal axis, where the inner filtering body is about ⅔ of the length as the outer filtering body.

14. The air filter of claim 12, where the inner filtering body has a tip, the tip protruding from the mouth of the outer filtering body.

15. The air filter of claim 12, including a lip having a circumference configuration that substantially conforms to an inlet opening of a scoop adapted to mount over an air intake system of a vehicle.

* * * * *